United States Patent
Ju et al.

(10) Patent No.: US 11,163,414 B2
(45) Date of Patent: Nov. 2, 2021

(54) FLEXIBLE TOUCH PANEL ELECTRODE STRUCTURE

(71) Applicant: Acer Incorporated, New Taipei (TW)

(72) Inventors: Tai Ju, New Taipei (TW); Chueh-Pin Ko, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/082,046

(22) Filed: Oct. 28, 2020

(65) Prior Publication Data
US 2021/0149528 A1 May 20, 2021

(30) Foreign Application Priority Data

Nov. 20, 2019 (TW) .................................. 108142114

(51) Int. Cl.
*G06F 3/044* (2006.01)
*G06F 3/041* (2006.01)

(52) U.S. Cl.
CPC ........ *G06F 3/0448* (2019.05); *G06F 3/04166* (2019.05); *G06F 2203/04102* (2013.01)

(58) Field of Classification Search
CPC ..................... G06F 3/0448; G06F 2203/04102
USPC ........................................................ 345/173
See application file for complete search history.

(56) References Cited

U.S. PATENT DOCUMENTS

| 2011/0050617 A1* | 3/2011 | Murphy ............... G06F 11/2221 345/174 |
| 2015/0068882 A1* | 3/2015 | Huang ................... G06F 3/0446 200/5 R |
| 2018/0203540 A1* | 7/2018 | Maguire ............. G06F 3/04166 |
| 2019/0043402 A1* | 2/2019 | Zeng ..................... G06F 3/0446 |
| 2019/0114455 A1 | 4/2019 | Kim |

FOREIGN PATENT DOCUMENTS

| CN | 204650467 | | 9/2015 |
| CN | 204650467 U | * | 9/2015 |
| TW | M495564 | | 2/2015 |
| TW | I498777 | | 9/2015 |
| TW | 201807553 | | 3/2018 |
| TW | 201841100 | | 11/2018 |
| TW | 201931094 | | 8/2019 |

* cited by examiner

*Primary Examiner* — Mark Edwards
(74) *Attorney, Agent, or Firm* — JCIPRNET

(57) ABSTRACT

A flexible touch panel electrode structure is provided, which includes: a substrate; a plurality of sensing electrodes and a plurality of drive electrodes disposed on the substrate respectively; a plurality of compensation electrodes which are staggered with the drive electrodes in position and compensate for at least one of the drive electrodes; and a control part coupled to the sensing electrodes, the drive electrodes, and the compensation electrodes. The compensation electrodes are grounded, and when the drive electrode malfunctions, the control part performs a switching operation to replace the drive electrode with the compensation electrode.

13 Claims, 7 Drawing Sheets

FLEXIBLE TOUCH PANEL ELECTRODE STRUCTURE

CROSS-REFERENCE TO RELATED APPLICATION

This application claims the priority benefit of Taiwan application no. 108142114, filed on Nov. 20, 2019. The entirety of the above-mentioned patent application is hereby incorporated by reference herein and made a part of this specification.

TECHNICAL FIELD

The invention relates to a touch panel electrode structure, and more particularly, to a flexible touch panel electrode structure.

BACKGROUND

With demands for larger screens from users, dimensions of mobile devices have been gradually increased. However, after the dimension of the device has reached a certain size, the oversized dimension will cause inconvenience in carrying. Foldable devices have been introduced in response to demands for portable and large screens. Users can change the size of the device according to the usage scenario to satisfy the portability, or to satisfy the visual demand for the large screen. The development of flexible panel technology is one of the most important technologies to achieve the demands. For panel devices, a touch function of the screen is the most important human-computer interaction interface. Therefore, finding a way to maximize an operating life of the touch panel becomes an important issue.

As shown in FIG. 1, in general, the touch panel is formed of electrodes arranged in X and Y directions. In order to balance the conductivity and the visibility, metal mesh or transparent metal oxides (ITO) are normally selected as a material of XY-direction electrodes. In addition, the electrodes in the touch panel are divided into drive electrodes (TX) and sensing electrodes (RX) according to different functions. Depending on different stacking methods, the TX/RX electrodes may be disposed on the same plane or on different planes. In practice, if the TX/RX electrodes are disposed on the different planes, the RX electrodes will be disposed on the plane close to the user, as shown in FIG. 2.

At present, based on the major method for the flexible device to switch between phone/tablet modes, the screen is disposed facing outward. FIG. 3 is a schematic diagram illustrating the RX/TX electrodes of the touch panel in a bending state. As shown in FIG. 3, taking TX/RX electrodes disposed on both sides of the substrate as an example, the RX electrodes are disposed on an outer side, and the TX electrodes are disposed on an inner side. If the TX/RX electrodes are disposed on the same side of the substrate, both the TX/RX electrodes will be disposed on the outer side. Because the TX electrode is disposed on an inner layer, a radius of curvature during bending is relatively small and more prone to a (micro) open circuit after multiple bendings.

SUMMARY

Based on the above, the invention proposes a flexible touch panel electrode structure disposed with compensation electrodes so that the system can maintain the normal operation of the device when detecting the (micro) open circuit of the TX electrode and extend the operating life of the device.

In addition, the invention proposes a self-adaptive touch panel electrode structure in which a compensation electrode can replace an original TX electrode (i.e., replace function of an original sensing channel) when the original sensing channel is damaged due to a high number of bendings, and thereby extend an operating life of the flexible panel.

According to an embodiment, the invention provides a flexible touch panel electrode structure, which includes: a substrate; a plurality of sensing electrodes and a plurality of drive electrodes disposed on the substrate respectively; a plurality of compensation electrodes, each of the plurality of compensation electrodes being staggered with the plurality of drive electrodes in position and compensating for at least one of the plurality of drive electrodes; and a control part coupled to the sensing electrodes, the drive electrodes, and the compensation electrodes. The compensation electrodes are grounded, and when the drive electrode malfunctions, the control part performs a switching operation to replace the drive electrode with the compensation electrode.

According to an embodiment of the invention, the plurality of sensing electrodes and the plurality of drive electrodes are disposed on the same side of the substrate respectively. Alternatively, according to another embodiment of the invention, the plurality of sensing electrodes and the plurality of drive electrodes are disposed on opposite sides of the substrate respectively.

According to an embodiment of the invention, a width of the compensation electrode is the same as a width of the drive electrode, and each of the plurality of compensation electrodes is disposed between the plurality of drive electrodes.

According to an embodiment of the invention, a width of the compensation electrode is at least twice a width of the drive electrode, and each of the plurality of compensation electrodes is disposed between the plurality of drive electrodes in a misalignment manner.

According to an embodiment of the invention, the compensation electrode is formed in a manner of surrounding at least one of the plurality of drive electrodes, and the compensation electrode and the drive electrode are disposed on the same plane or different planes.

According to an embodiment of the invention, a thickness of the compensation electrode is greater than a thickness of the drive electrode. According to an embodiment of the invention, the compensation electrode is disposed at a location distant from a bending axis of a flexible touch panel.

According to another embodiment, the invention provides a control method of a flexible touch panel electrode structure, and the flexible touch panel electrode structure may be the structure described above. The control method includes: scanning each of the plurality of drive electrodes; determining whether a state of the drive electrode is abnormal; when the drive electrode is determined to be abnormal, replacing the drive electrode with the compensation electrode; and scanning the compensation electrode and checking a state of the compensation electrode.

In another embodiment, the control method further includes: scanning the plurality of sensing electrodes; and performing a calculation according to data transmitted from the compensation electrode and the sensing electrode to obtain location data.

In summary, according to the flexible touch panel electrode structure and the control method thereof, with disposition of the compensation electrodes, when the TX electrode malfunctions due to the bendings such that the sensing channel cannot operate normally, the system can self-adaptively replace the TX electrode with the compensation electrode. In such case, the compensation electrode is charged from its original grounded state to replace function of the TX electrode. Thus, the sensing channel that was originally abnormal can continue to be used normally because of the compensation electrode. As a result, with this architecture, the flexible touch panel electrode structure and the control method can extend the operating life of the flexible touch panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
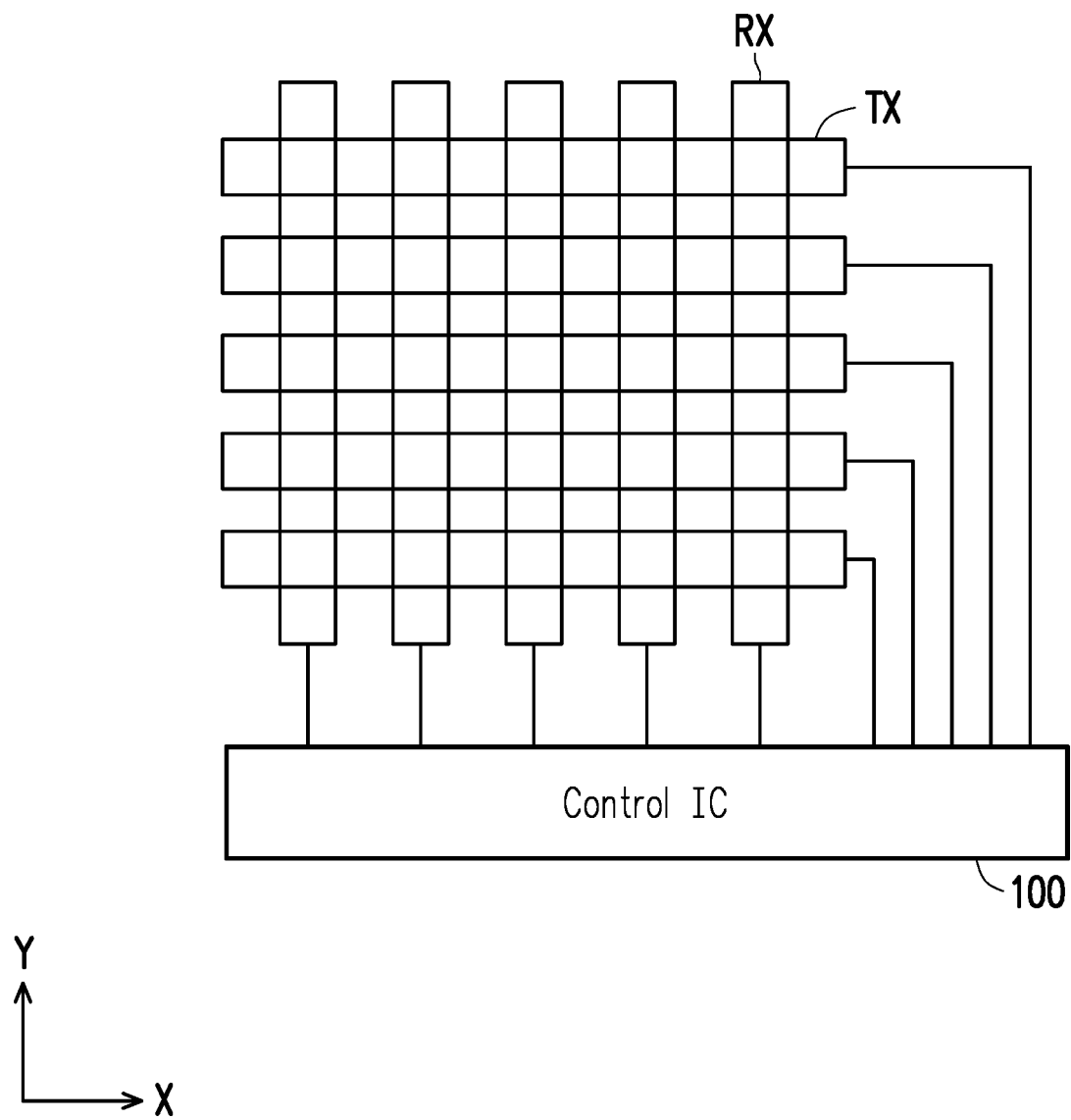
FIG. 1 is a schematic diagram illustrating an electrode configuration in a conventional touch panel.
Figure 2:
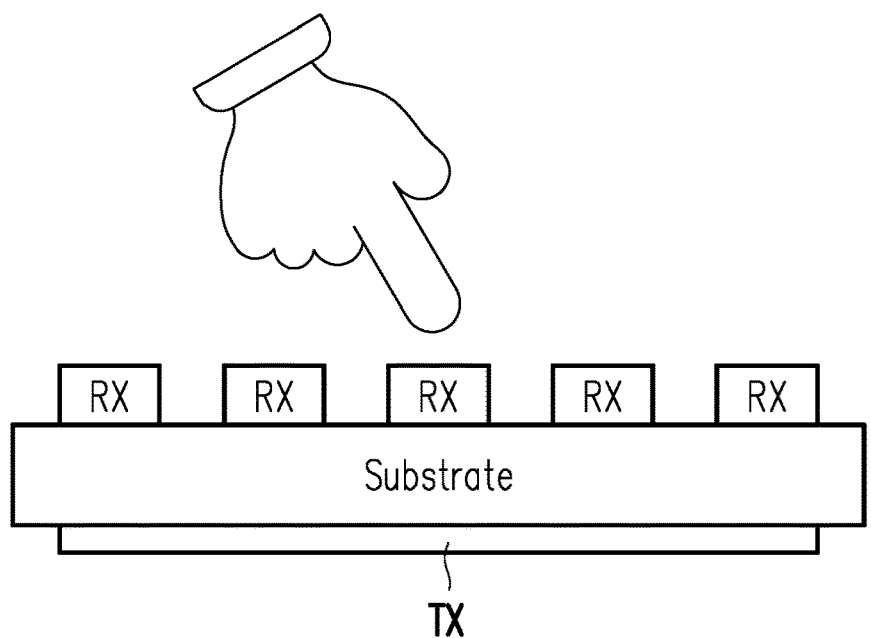
FIG. 2 is a schematic diagram illustrating a configuration of RX electrodes and TX electrodes in a touch panel mode.
Figure 3:
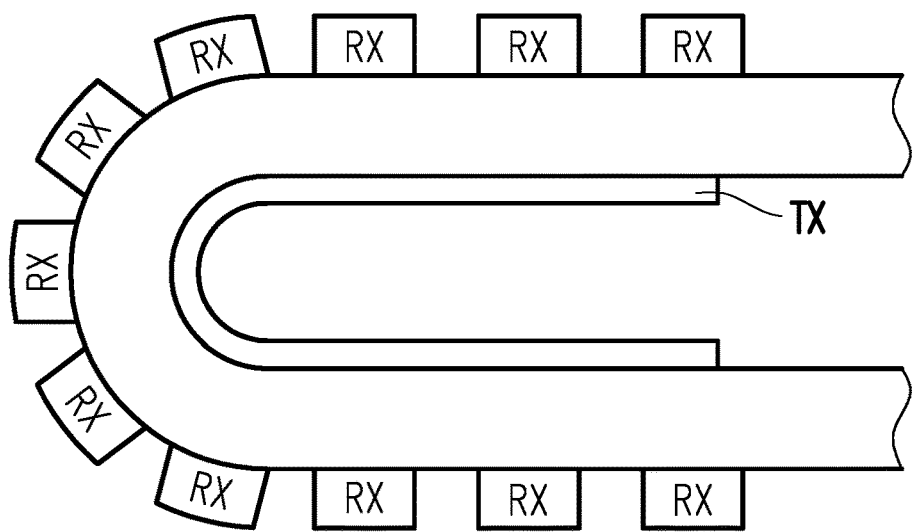
FIG. 3 is a schematic diagram illustrating the RX/TX electrodes of the touch panel in a bending state.

Reference will now be made in detail to the present preferred embodiments of the invention, examples of which are illustrated in the accompanying drawings. Wherever possible, the same reference numbers are used in the drawings and the description to refer to the same or like parts.

A flexible touch panel electrode structure of the invention at least includes a substrate; a plurality of sensing electrodes and a plurality of drive electrodes, which are disposed on the substrate respectively; a plurality of compensation electrodes, each of the compensation electrodes is staggered with the drive electrodes in position and when the drive electrode malfunctions, configured to compensate for the drive electrode that malfunctions; and a control part, which is coupled to the sensing electrodes, the drive electrodes, and the compensation electrodes. The compensation electrodes are normally grounded, and when the drive electrode malfunctions, the control part performs a switching operation to replace the drive electrode with the compensation electrode.

Figure 4:
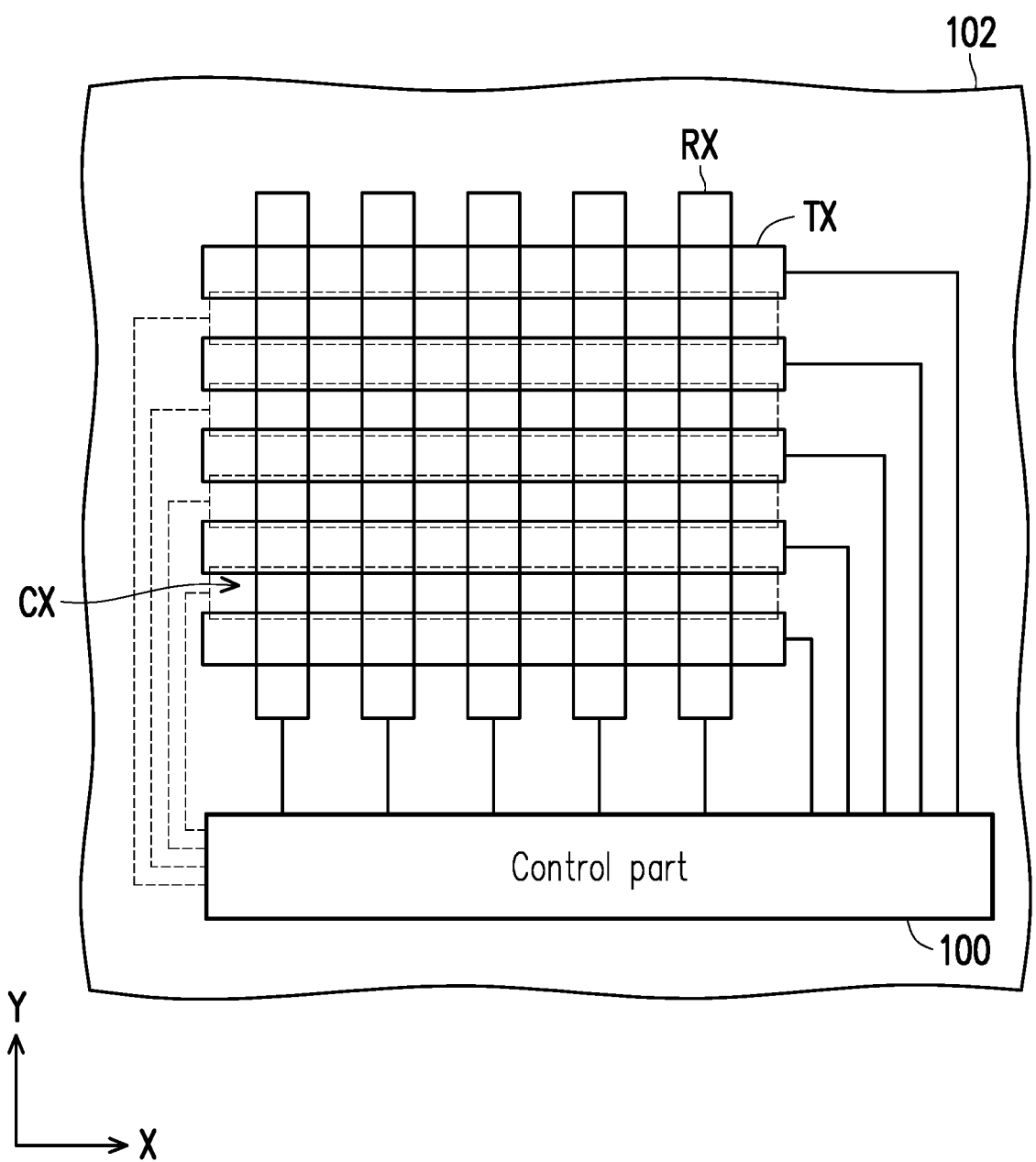
FIG. 4 is a schematic diagram illustrating an electrode disposition in a touch panel according to an embodiment of the invention.

FIG. 4 is a schematic diagram illustrating an example of an electrode disposition in a touch panel according to an embodiment of the invention. As shown in FIG. 4, the TX/RX electrodes are disposed on the same side of a substrate 102, and compensation electrodes C are disposed on the other side of the substrate 102 (i.e., an opposite side of the substrate 102). Here, the TX electrodes are disposed parallel to each other in the X direction, and the RX electrodes are disposed parallel to each other in the Y direction. The TX electrodes and the RX electrodes are disposed perpendicular to each other. The TX electrodes and the RX electrodes are respectively coupled to a touch IC (or known as a control part) 100.

As shown in FIG. 4, the flexible touch panel electrode structure further includes compensation electrodes CX, which are also coupled to the control part 100. In a normal state (i.e., a state in which the TX electrode does not malfunction), the compensation electrode CX constantly stays in a grounded state without affect the normal operation of the TX/RX electrodes. As shown in FIG. 4, considering that the compensation electrode CX is used as a preliminary means and needs a higher anti-deflection ability than the TX electrode, one compensation electrode CX can correspond to at least one TX electrode when being disposed. In this figure, for convenience, one compensation electrode CX corresponding to one TX electrode is taken as an example.

In addition, the control part 100 is configured to control various operations and functions of the entire touch panel, such as scanning, charging/discharging, data reading and Interpretation for each electrode. In this embodiment, the control part 100 is further used to switch the TX electrode to the compensation electrode CX. For example, the control part 100 may have a multiplexer switch for switching of the compensation electrodes CX and the TX electrodes.

In addition, although the TX/RX electrodes are disposed on the same side of the substrate in the example shown in FIG. 4, the invention is not limited thereto. The TX electrodes and the RX electrodes may also be disposed on two sides of the substrate 102, respectively.

In practical applications, the control part 100 can repeatedly perform the operations of charging/discharging and data reading for each of the TX electrodes, so as to determine whether the compensation electrode needs to be activated for assistance according to a state of the channel. Further, by setting up a threshold value, when a read value of one specific channel is greater than or less than the set threshold value, it may then be determined that the TX electrode malfunctions. In such case, the control part 100 may activate the compensation electrode CX corresponding to the TX electrode that malfunctions to take over original function of the TX electrode through a multiplexer (MUX) switch.

In addition, in order to make the compensation electrode CX have the higher anti-deflection ability, for example, the compensation electrodes may be formed by making the compensation electrode CX greater in both thickness and width than the TX electrode.

Figure 5A:
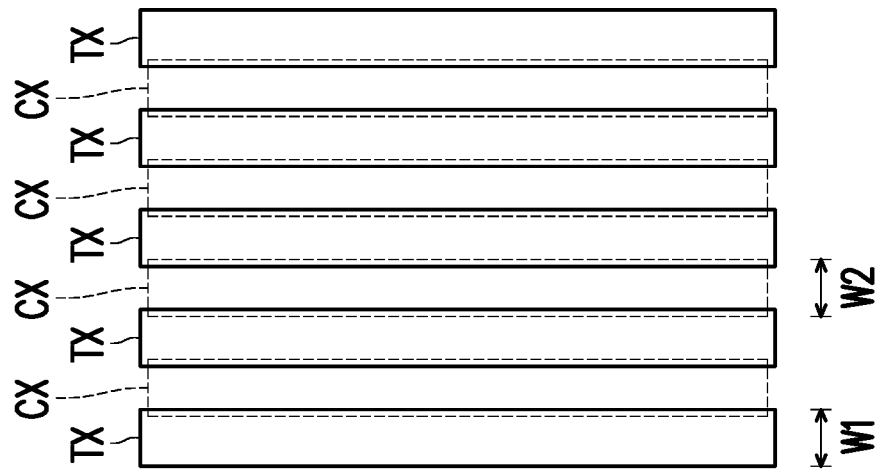
FIGS. 5A to 5D are schematic plan views illustrating a compensation electrode disposition according to an embodiment of the invention.
Figure 5B:
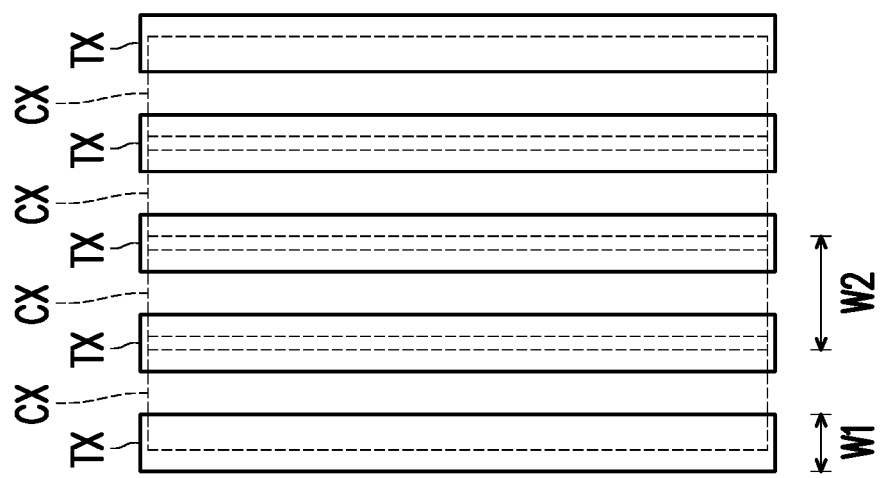
Figure 5C:
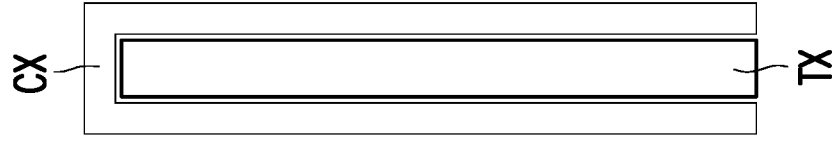

FIGS. 5A to 5C are schematic plan views illustrating a compensation electrode disposition according to an embodiment of the invention. Various feasible methods for disposing the compensation electrodes are described as follows. For making the relative positional relationship between the electrodes easier to read, only the TX electrodes and the compensation electrodes CX are illustrated in FIGS. 5A to 5C.

As shown in FIG. 5A, in this architecture, for example, the compensation electrodes CX (indicated by dotted lines) are disposed under the TX electrodes, and the compensation electrodes CX are staggered with the TX electrodes in position. Herein, the so-call "staggered" refers to the fact that the TX electrodes do not completely cover the compensation electrodes CX in the plan view. Accordingly, when the TX electrode is replaced with the compensation electrode CX, a channel between the RX electrode and the compensation electrode may be prevented from being blocked. As shown in FIG. 5A, a width w2 of the compensation electrode CX is twice a width w1 of the TX electrode. Through this architecture, the required IC pins may be reduced.

Further, as shown in FIG. 5B, in this architecture, for example, the compensation electrodes CX (indicated by dotted lines) are disposed under the TX electrodes, and the compensation electrodes CX are staggered with the TX electrodes in position. Herein, the so-call "staggered" refers to the fact that the TX electrodes do not completely cover the compensation electrodes CX in the plan view. However, in this architecture, the width w2 of the compensation electrode CX is equal to the width w1 of the TX electrode. According to this architecture, although the width w2 of the compensation electrode CX is equal to the width w1 of the TX electrode, the compensation electrode CX and the TX electrode are misaligned to achieve function of avoiding the screening effect.

Figure 5D:
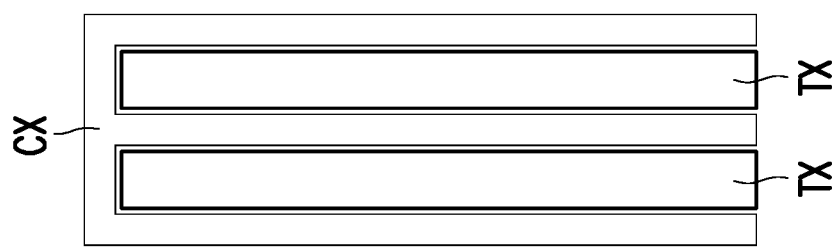

In addition, as shown in FIG. 5C and FIG. 5D, the compensation electrode CX is formed in a manner of surrounding and encapsulating the TX electrode(s). In this architecture, a pattern of the compensation electrode CX is different from a pattern of the TX electrode. According to this architecture, a better signal can be provided to the RX electrode. Furthermore, in this architecture, the compensation electrode CX and the TX electrode may be disposed on the same plane and may also be disposed on different planes.

Figure 6A:
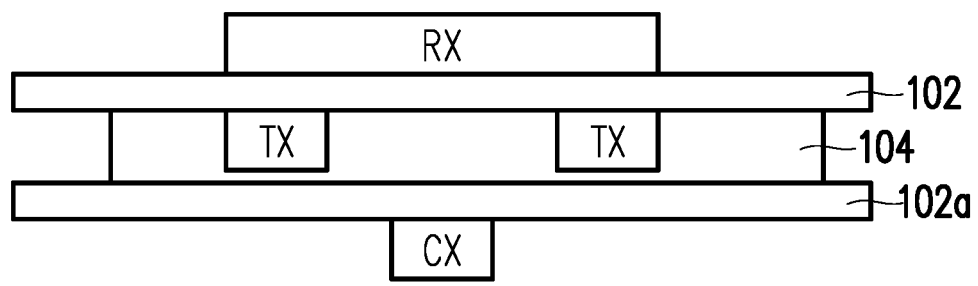
FIGS. 6A to 6C are cross-sectional plan views illustrating a compensation electrode disposition according to an embodiment of the invention.
Figure 6B:
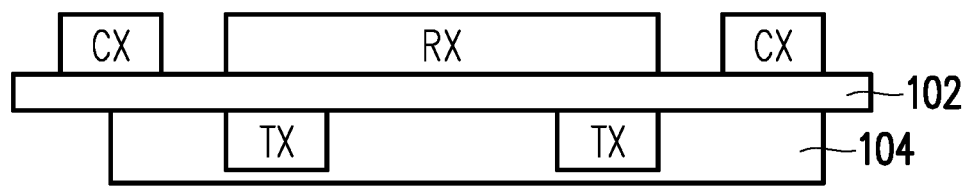
Figure 6C:
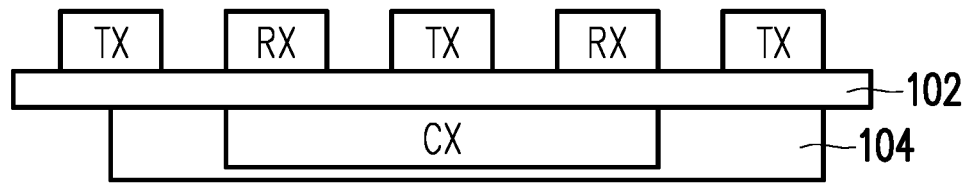

FIGS. 6A to 6C are cross-sectional plan views illustrating a compensation electrode disposition according to an embodiment of the invention. As can be seen from FIGS. 6A to 6C, several ways of making stacking structures and corresponding dispositions of the compensating electrodes for the touch panel are provided.

As shown in FIG. 6A, the TX/RX electrodes of the touch panel may also be disposed on two sides of the substrate 102, respectively. In this case, another substrate 102a is required to support the compensation electrodes CX, and the two substrates 102 and 102a may be bonded together using an optical clear adhesive (OCA) 104. Further, the structure design of the compensation electrodes in FIG. 6A may correspond to the structure shown in FIG. 5A or FIG. 5B.

In addition, as shown in FIG. 6B, the compensation electrode CX and the RX electrode may also be disposed on the same plane of the substrate 102. The structure design of the compensation electrodes in FIG. 6B may, for example, correspond to the structure shown in FIG. 5C or FIG. 5D. In addition, as shown by FIG. 6C, in this architecture, the TX/RX electrodes are disposed on the same plane of the substrate 102, and the compensation electrode CX is disposed on the other plane of the substrate 102.

Figure 7:
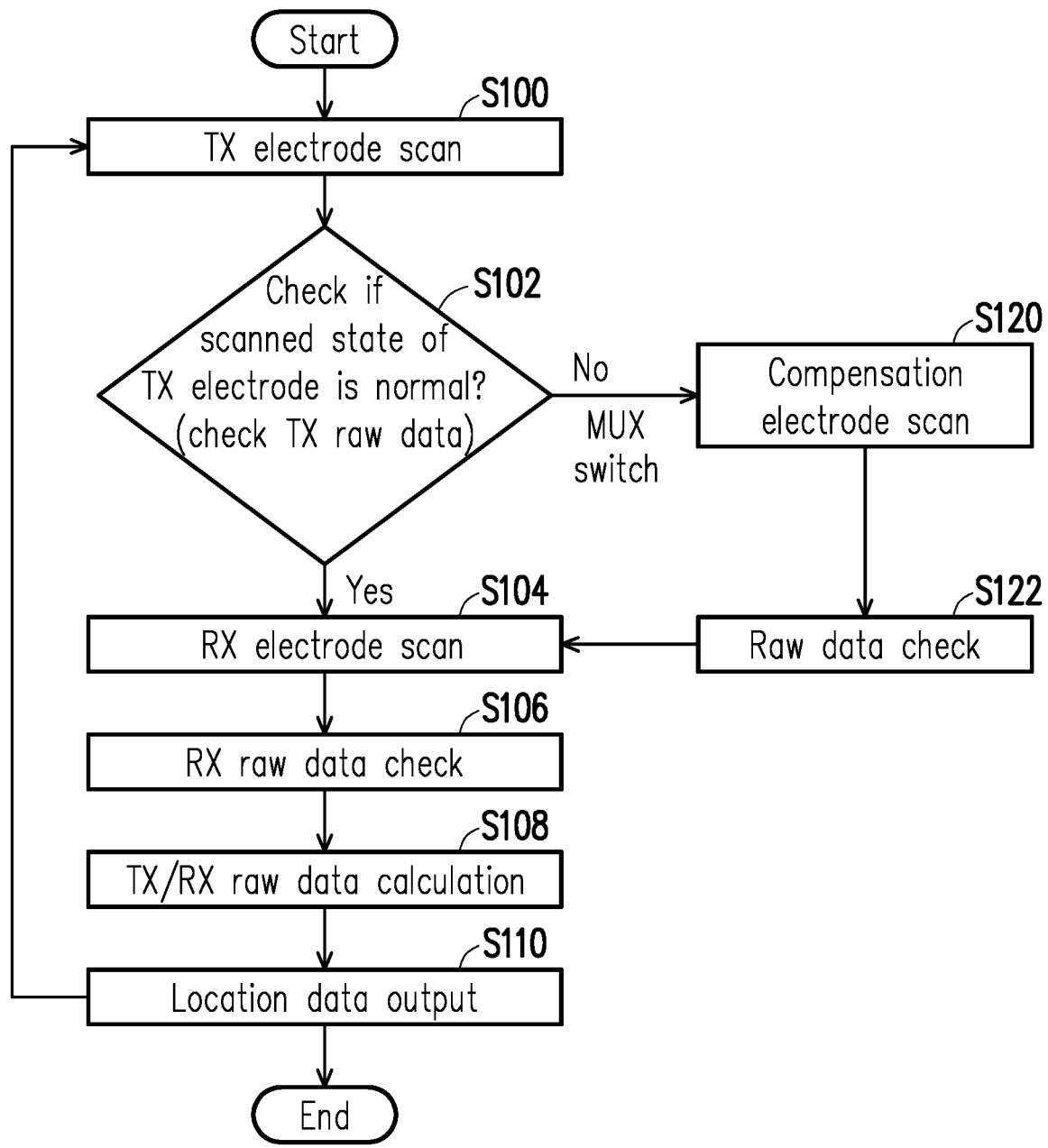
FIG. 7 is a flowchart illustrating a control method of a flexible touch panel electrode structure according to an embodiment of the invention.

FIG. 7 is a flowchart illustrating a control method of a self-adaptive touch panel electrode structure according to an embodiment of the invention.

As shown in FIG. 7, in step S100, the control part 100 sequentially scans each of the TX electrodes. Next, in step S102, after the TX electrode is scanned, the control part 100 checks raw data of the TX electrode and determines a state of the TX electrode. Step S102 may also be referred to as a TX electrode state check, which mainly checks whether the TX electrode malfunctions (e.g., open circuit).

For example, in step S102, the control part 100 receives a read value corresponding to the capacitance of the TX electrode. An algorithm in the control part 100 compares the read value with a preset threshold. When the read value is lower than the threshold value, it is determined that the channel corresponding to TX electrode has the (micro) open circuit. That is, in step S102, the control part 100 proceeds to execute step S120 when determining that the checked data is abnormal (i.e., "No"), and otherwise, proceeds to execute step S104 when determining that the checked data is normal (i.e., "Yes").

In step S102, the TX electrode state may be checked by, for example, checking data regarding a charging/discharging time for the TX electrode. In case of the open circuit (abnormal), because the capacitance will become smaller, the charging/discharging time will be faster, that is, the speed will be faster. In this way, whether the TX electrode malfunctions may be learnt.

Next, in step S120, the control part 100 activates a switching operation by using, for example, the multiplexer switch (MUX switch) to switch the sensing channel (i.e., replacing the TX electrode with the compensation electrode CX as described above). In such case, the compensation electrode CX is no longer being grounded but operated as the TX electrode.

Next, in step S122, the compensation electrode CX used to replace the TX electrode is scanned. When the scanning of the compensation electrode CX is completed and checked, the method proceeds to step S104. In step S104, the control part 100 scans the RX electrode.

Next, in step S106, the control part 100 checks raw data of the RX electrode. Afterwards, in step S108, the control part 100 performs a calculation based on data transmitted from the TX/RX electrodes. At the time, the TX electrode is already replaced by the compensation electrode.

Then, in step S110, based on a calculation result obtained in step S108, the control part 100 can output location data (i.e., a location coordinate at which the panel is touched by the user). Accordingly, the system (the touch panel) can perform subsequent actions according to the location coordinate.

In addition, when the hardware is normal (i.e., the TX electrode of the touch panel is not damaged; a determination result in step S102 is "Yes"), the compensation electrode CX is constantly grounded and inactivated. The control part 100 then scans and checks the data for the TX electrodes and the RX electrodes respectively in accordance with steps S100 to S110, and performs the calculation according to the data of the TX/RX electrodes. Then, the location coordinates obtained from the calculation are transmitted to the system for subsequent corresponding operations.

In summary, according to the flexible touch panel electrode structure and the control method thereof, with disposition of the compensation electrodes, when the TX electrode malfunctions due to the bendings such that the sensing channel cannot operate normally, the system can self-adaptively replace the TX electrode with the compensation electrode. In such case, the compensation electrode is charged from its original grounded state to replace function of the TX electrode. Thus, the sensing channel that was originally abnormal can continue to be used normally because of the compensation electrode. As a result, with this architecture, the flexible touch panel electrode structure and the control method can extend the operating life of the flexible touch panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flexible touch panel electrode structure, comprising:
a substrate;
a plurality of sensing electrodes and a plurality of drive electrodes disposed on the substrate respectively;
a plurality of compensation electrodes, each of the plurality of compensation electrodes being staggered with the plurality of drive electrodes in position and compensating for at least one of the plurality of drive electrodes; and
a control part coupled to the plurality of sensing electrodes, the plurality of drive electrodes, and the plurality of compensation electrodes,
wherein the plurality of compensation electrodes are grounded, and when the drive electrode malfunctions, the control part performs a switching operation to replace the drive electrode with the compensation electrode, and
a width of the compensation electrode is at least twice a width of the drive electrode, and each of the plurality of compensation electrodes is disposed between the plurality of drive electrodes in a misalignment manner.

2. The flexible touch panel electrode structure according to claim 1, wherein the plurality of sensing electrodes and the plurality of drive electrodes are disposed on the same side of the substrate respectively.

3. The flexible touch panel electrode structure according to claim 1, wherein the plurality of sensing electrodes and the plurality of drive electrodes are disposed on opposite sides of the substrate respectively.

4. The flexible touch panel electrode structure according to claim 1, wherein a width of the compensation electrode is the same as a width of the drive electrode, and each of the plurality of compensation electrodes is disposed between the plurality of drive electrodes.

5. The flexible touch panel electrode structure according to claim 1, wherein the compensation electrode is formed in a manner of surrounding at least one of the plurality of drive electrodes, and the compensation electrode and the drive electrode are disposed on the same plane or different planes.

6. The flexible touch panel electrode structure according to claim 1, wherein a thickness of the compensation electrode is greater than a thickness of the drive electrode.

7. The flexible touch panel electrode structure according to claim 1, wherein the compensation electrode is disposed at a location distant from a bending axis of a flexible touch panel.

8. A control method of a flexible touch panel electrode structure, comprising:
providing a flexible touch panel electrode structure, in which the flexible touch panel electrode structure comprises a substrate; a plurality of sensing electrodes and a plurality of drive electrodes disposed on the substrate respectively; and a plurality of compensation electrodes that are grounded, each of the plurality of compensation electrodes being staggered with the plurality of drive electrodes in position and compensating for at least one of the plurality of drive electrodes;
scanning each of the plurality of drive electrodes;
determining whether a state of the drive electrode is abnormal;
when the drive electrode is determined to be abnormal, replacing the drive electrode with the compensation electrode; and
scanning the compensation electrode and checking a state of the compensation electrode,
wherein a width of the compensation electrode is at least twice a width of the drive electrode, and each of the plurality of compensation electrodes is disposed between the plurality of drive electrodes in a misalignment manner.

9. The control method of the flexible touch panel electrode structure according to claim 8, wherein
scanning the plurality of sensing electrodes; and
performing a calculation according to data transmitted from the compensation electrode and the sensing electrode to obtain location data.

10. The control method of the flexible touch panel electrode structure according to claim 8, further comprising:
scanning the plurality of sensing electrodes when the drive electrode is determined to be normal;
performing a calculation according to data transmitted from the drive electrode and the sensing electrode to obtain location data.

11. The control method of the flexible touch panel electrode structure according to claim 8, wherein
whether a state of the drive electrode is abnormal is determined according to a time for charging or discharging the drive electrode.

12. The control method of the flexible touch panel electrode structure according to claim 8, wherein a width of the compensation electrode is the same as a width of the drive electrode, and each of the plurality of compensation electrodes is disposed between the plurality of drive electrodes.

13. The control method of the flexible touch panel electrode structure according to claim 8, further comprising:
forming the compensation electrode in a manner of surrounding at least one of the plurality of drive electrodes, and the compensation electrode and the drive electrode are disposed on the same plane or different planes.

* * * * *